(12) United States Patent
Hoshiba

(10) Patent No.: US 11,239,487 B2
(45) Date of Patent: Feb. 1, 2022

(54) WOUND ELECTRODE ASSEMBLY FOR NONAQUEOUS ELECTROLYTE RECHARGEABLE BATTERY, NONAQUEOUS ELECTROLYTE RECHARGEABLE BATTERY INCLUDING THE SAME, AND METHOD FOR MANUFACTURING THE SAME

(71) Applicant: SAMSUNG SDI CO., LTD., Yongin-si (KR)

(72) Inventor: Koji Hoshiba, Yokohama (JP)

(73) Assignee: SAMSUNG SDI CO., LTD., Yongin-si (KR)

( * ) Notice: Subject to any disclaimer, the term of this patent is extended or adjusted under 35 U.S.C. 154(b) by 906 days.

(21) Appl. No.: 14/967,816

(22) Filed: Dec. 14, 2015

(65) Prior Publication Data

US 2016/0172705 A1 Jun. 16, 2016

(30) Foreign Application Priority Data

Dec. 22, 2014 (JP) .............................. JP2014-258190
Oct. 13, 2015 (KR) ......................... 10-2015-0142804

(51) Int. Cl.
*H01M 10/00* (2006.01)
*H01M 10/04* (2006.01)
(Continued)

(52) U.S. Cl.
CPC ....... *H01M 10/0431* (2013.01); *H01M 4/623* (2013.01); *H01M 50/461* (2021.01);
(Continued)

(58) Field of Classification Search
CPC ......... H01M 10/0431; H01M 10/0525; H01M 10/0587; H01M 2/168; H01M 2/1686; H01M 4/623; H01M 50/461
See application file for complete search history.

(56) References Cited

U.S. PATENT DOCUMENTS 9,172,074 B2   10/2015  Weber et al.
2005/0095505 A1   5/2005  Ohata et al.
(Continued)

FOREIGN PATENT DOCUMENTS

JP         10-110052 A     4/1998
JP      2004-214042 A     7/2004
(Continued)

OTHER PUBLICATIONS

9—Introduction to Vinylidene Fluoride Polymers, Editor(s): Sina Ebnesajjad, Introduction to Fluoropolymers, William Andrew Publishing, 2013, pp. 133-148, ISBN 9781455774425, https://doi.org/10.1016/B978-1-4557-7442-5.00009-7. http://www.sciencedirect.com/science/article/pii/B9781455774425000097) (Year: 2013).*

(Continued)

*Primary Examiner* — Milton I Cano
*Assistant Examiner* — Mary G Henshaw
(74) *Attorney, Agent, or Firm* — Lee IP Law, P.C.

(57) ABSTRACT

A wound electrode assembly for a non-aqueous electrolyte rechargeable battery, the wound electrode assembly including a positive electrode, a negative electrode, and a porous film between the positive electrode and negative electrode, the positive electrode, the negative electrode, and the porous film each being belt-shaped, and an adhesive layer on the surface of the porous film. The adhesive layer includes a fluorine resin-containing particulate, a binder particle supporting the fluorine resin-containing particulate and having a smaller total volume than that of the fluorine resin-containing particulate, and a heat-resistant filler particle. An average particle diameter of the binder particle is about 100 nm to about 500 nm. An average particle diameter of the heat-resistant filler particle is about 10 nm to about 100 nm.

11 Claims, 3 Drawing Sheets

(51) Int. Cl.
    *H01M 4/62*     (2006.01)
    *H01M 50/46*     (2021.01)
    *H01M 10/0587*     (2010.01)
    *H01M 50/449*     (2021.01)
    *H01M 10/0525*     (2010.01)

(52) U.S. Cl.
    CPC .... *H01M 10/0525* (2013.01); *H01M 10/0587* (2013.01); *H01M 50/449* (2021.01)

(56) References Cited

U.S. PATENT DOCUMENTS

| | | |
|---|---|---|
| 2013/0209882 A1 | 8/2013 | Kim et al. |
| 2013/0252066 A1 | 9/2013 | Yeou et al. |
| 2013/0280584 A1 | 10/2013 | Matsumura |
| 2013/0302661 A1* | 11/2013 | Kim .............. H01M 2/166 429/144 |
| 2014/0272532 A1 | 9/2014 | Park et al. |
| 2014/0308565 A1 | 10/2014 | Lee et al. |
| 2014/0363726 A1 | 12/2014 | Honda et al. |
| 2015/0236323 A1 | 8/2015 | Honda et al. |
| 2015/0311490 A1 | 10/2015 | Murase et al. |
| 2017/0346057 A1* | 11/2017 | Kai .............. H01M 2/1686 |

FOREIGN PATENT DOCUMENTS

| | | |
|---|---|---|
| JP | 2005-135674 A | 5/2005 |
| JP | 2010-538173 A | 12/2010 |
| JP | 2011-204627 A | 10/2011 |
| JP | 2012-190784 A | 10/2012 |
| JP | 2013-105681 A | 5/2013 |
| JP | 2013-165061 A | 8/2013 |
| JP | 2013-197092 A | 9/2013 |
| JP | 2014-175055 A | 9/2014 |
| JP | 2015-125882 A | 7/2015 |
| KR | 10-2014-0003429 A | 1/2014 |
| KR | 10-2014-0112384 A | 9/2014 |
| WO | WO 2013/073503 A1 | 5/2013 |
| WO | WO 2013/133074 A1 | 9/2013 |
| WO | WO 2014/081035 A1 | 5/2014 |

OTHER PUBLICATIONS

Astlett Rubber SBR 1502 fact sheet (Year: 2012).*
Japanese Notice of Allowance dated Aug. 7, 2018, of the corresponding Japanese Patent Application No. 2014-258190.

* cited by examiner

WOUND ELECTRODE ASSEMBLY FOR NONAQUEOUS ELECTROLYTE RECHARGEABLE BATTERY, NONAQUEOUS ELECTROLYTE RECHARGEABLE BATTERY INCLUDING THE SAME, AND METHOD FOR MANUFACTURING THE SAME

CROSS-REFERENCE TO RELATED APPLICATION

Japanese Patent Application No. 2014-258190, filed on Dec. 12, 2014, in the Japanese Patent Office, and Korean Patent Application No. 10-2015-0142804, filed on Oct. 13, 2015, in the Korean Intellectual Property Office, and entitled: "Wound Electrode Assembly for Nonaqueous Electrolyte Rechargeable Battery, Nonaqueous Electrolyte Rechargeable Battery Including the Same, and Method for Manufacturing the Same," are incorporated by reference herein in their entirety.

BACKGROUND

1. Field

Embodiments relate to a wound electrode assembly for a non-aqueous electrolyte rechargeable battery, a non-aqueous electrolyte rechargeable battery using the same, and a method of manufacturing the wound electrode assembly for a non-aqueous electrolyte rechargeable battery.

2. Description of the Related Art

A polyvinylidene fluoride (PVDF)-based fluorine resin may be used as a matrix polymer of a gel electrolyte for a rechargeable lithium ion battery has been actively made. For example, a porous film made of the PVDF-based fluorine resin may be formed on the surface of a separator.

SUMMARY

Embodiments are directed to a wound electrode assembly for a non-aqueous electrolyte rechargeable battery, the wound electrode assembly including a belt-shaped positive electrode, a belt-shaped negative electrode, a belt-shaped porous film between the belt-shaped positive electrode and belt-shaped negative electrode, and an adhesive layer on the surface of the belt-shaped porous film. The adhesive layer includes a fluorine resin-containing particulate, a binder particle supporting the fluorine resin-containing particulate and having a smaller total volume than that of the fluorine resin-containing particulate, and a heat-resistant filler particle. An average particle diameter of the binder particle is about 100 nm to about 500 nm. An average particle diameter of the heat-resistant filler particle is about 10 nm to about 100 nm.

The average particle diameter of the binder particle and the average particle diameter of the heat-resistant filler particle may satisfy at least one Equations 1 and 2:

$$y < (50/17)*(x+70) \quad (1)$$

$$y > (10/7)*(120-x) \quad (2)$$

wherein, in Equations 1 and 2, y is the average particle diameter of the binder particle and x is the average particle diameter of the heat-resistant filler particle.

The average particle diameter of the binder particle and the average particle diameter of the heat-resistant filler particle may satisfy both the Equations 1 and 2.

The belt-shaped negative electrode may include a negative active material layer including a negative active material and the fluorine resin-containing particulate. The adhesive layer may be bound to the negative active material layer.

The fluorine resin-containing particulate may be a spherical particle.

The fluorine resin may include polyvinylidene fluoride.

A ratio of the total volume of the fluorine resin-containing particulate to the total volume of the binder particle may be in a range of about 2 to about 20.

Embodiments are also directed to a non-aqueous electrolyte rechargeable battery including the wound electrode assembly for a non-aqueous electrolyte rechargeable battery as described above.

Embodiments are also directed to a method of manufacturing a wound electrode assembly for a non-aqueous electrolyte rechargeable battery including coating an aqueous slurry including a fluorine resin-containing particulate, a binder particle supporting the fluorine resin-containing particulate and having a smaller total volume than that of the fluorine resin-containing particulate, and a heat-resistant filler particle, onto a surface of a belt-shaped porous film, followed by drying the resultant, an average particle diameter of the binder particle being about 100 nm to about 500 nm, and an average particle diameter of the heat-resistant filler particle being about 10 nm to about 100 nm.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
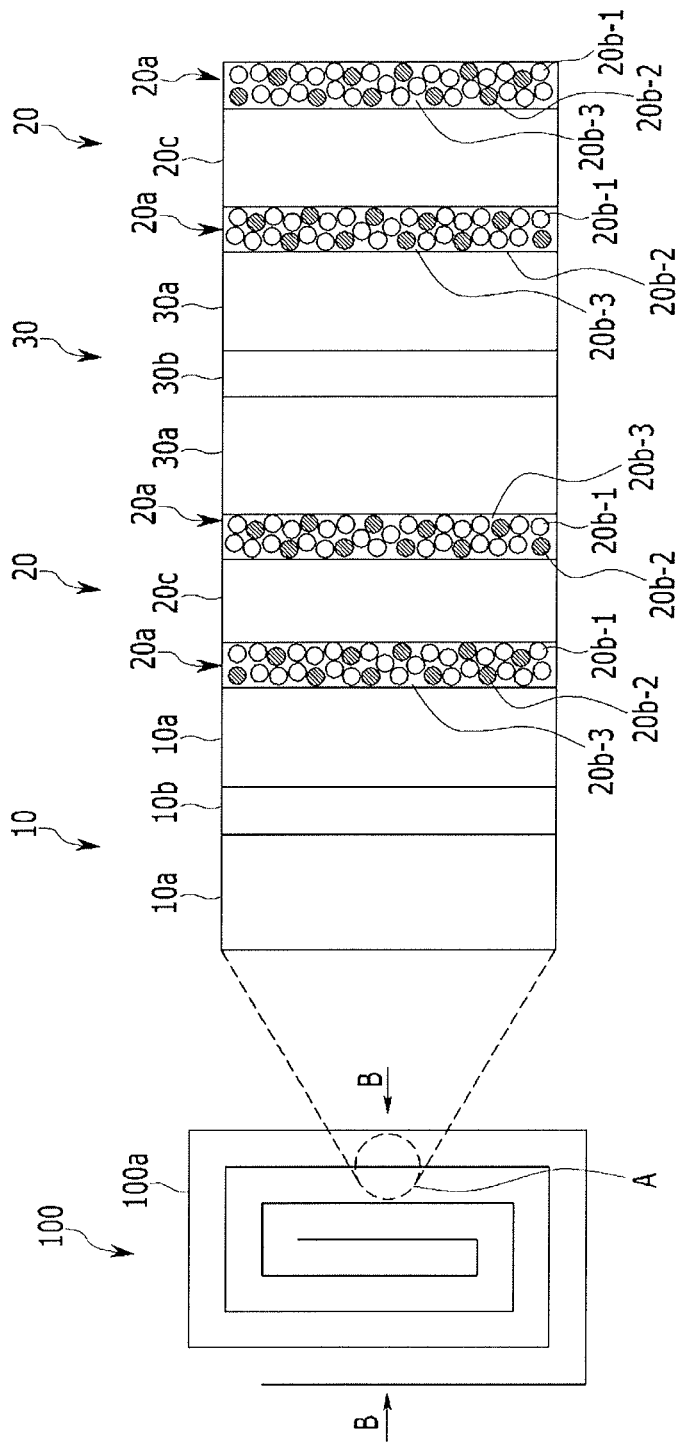
FIG. 1 illustrates a cross-sectional view showing the schematic structure of a rechargeable lithium ion battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

Structure of Rechargeable Lithium Ion Battery

Entire Structure of Rechargeable Lithium Ion Battery

Figure 2:
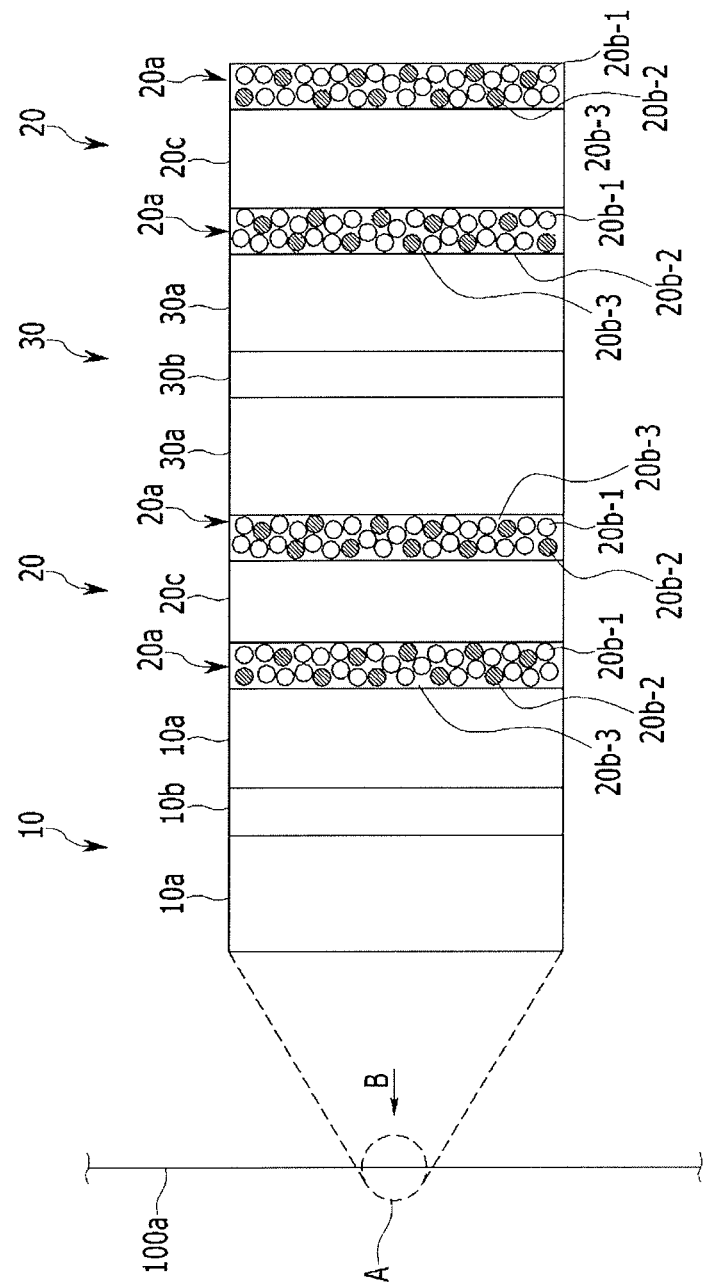
FIG. 2 illustrates a cross-sectional view showing the schematic structure of an electrode stack structure according to an embodiment.

Referring to FIGS. 1 and 2, a structure of a rechargeable lithium ion battery according to one embodiment is illustrated. FIG. 1 provides a cross-section view showing a wound electrode assembly 100 and an enlarged view regarding the region A of the wound electrode assembly 100. FIG. 2 provides a cross-section view showing an electrode stack structure 100a in which a positive electrode, a negative electrode, and two sheets of separator are stacked and an enlarged view showing the region A of the electrode stack structure 100*a*.

The rechargeable lithium ion battery may include a wound electrode assembly 100, a non-aqueous electrolyte solution, and an exterior material. The wound electrode assembly 100 may be obtained by winding the electrode stack structure 100*a* obtained by sequentially stacking a belt-shaped negative electrode 10, a belt-shaped separator 20, a belt-shaped positive electrode 30, and a belt-shaped separator 20 in a length direction and compressing the wound electrode stack structure 100*a* in an arrow direction B.

Structure of Negative Electrode

The belt-shaped negative electrode 10 may include a negative current collector 10*b* and negative active material layers 10*a* formed on both sides of the negative current collector 10*b*. The belt-shaped negative electrode 10 may be an aqueous negative electrode. For example, the wound electrode assembly 100 and the rechargeable lithium ion battery may include an aqueous negative electrode.

The negative active material layer 10*a* may include a negative active material, a thickener, and a binder. The negative active material of the negative active material layer 10*a* may be a suitable material that is alloyable with lithium or that reversibly intercalates and deintercalates lithium. For example, the negative active material may include a metal such as lithium, indium (In), tin (Sn), aluminum (Al), silicon (Si), or the like, alloys, or oxides thereof; a transition metal oxide such as $Li_{4/3}Ti_{5/3}O_4$, SnO, or the like; a carbon material such as artificial graphite, natural graphite, a mixture of artificial graphite and natural graphite, natural graphite coated with artificial graphite, a graphite carbon fiber, resin-fired carbon, thermal decomposition vapor grown carbon, coke, mesocarbon microbeads (MCMB), a furfuryl alcohol resin-fired carbon, polyacene, a pitch-based carbon fiber, a vapor grown carbon fiber, natural graphite, non-graphitizable carbon, or the like. These negative active materials may be used singularly or in a mixture of two or more. For example, graphite-based materials may be used as a main material.

The thickener may adjust a viscosity of negative active material layer slurry to be suitably coated and may simultaneously act as a binder in the negative active material layer 10*a*. The thickener may be a water-soluble polymer, for example a cellulose-based polymer, a polyacrylic acid-based polymer, polyvinyl alcohol, polyethylene oxide, or the like. The cellulose-based polymer may be, for example, a metal salt of carboxymethyl cellulose (CMC), an alkali metal salt or an ammonium salt, a cellulose derivative such as methyl cellulose, ethyl cellulose, hydroxy alkyl cellulose, or the like. The thickener may be polyvinylalcohol or a modification thereof; polyethyleneoxide; polyvinylpyrrolidone; starch; phosphoric acid starch; casein; a modified starch; chitin; a chitosan derivative, or the like. These thickeners may be used singularly or in a mixture of two or more. For example, the cellulose-based polymer may be used, or, for example, an alkali metal salt of carboxymethyl cellulose may be used.

The binder may attach negative active materials to each other. The binder may be a suitable binder for an aqueous negative electrode. Examples of the binder include a particulate of an elastomer-based polymer. The elastomer-based polymer may be SBR (styrene butadiene rubber), BR (butadiene rubber), NBR (nitrile-butadiene rubber), NR (natural rubber), IR (isoprene rubber), EPDM (ethylene-propylene-diene terpolymer), CR (chloroprene rubber), CSM (chloro sulfonated polyethylene), acrylic acid ester, a copolymer of methacrylic acid ester, or a partly or wholly hydrogenated polymer thereof, an acrylic acid ester-based copolymer, or the like. In order to improve the binding properties, the elastomer-based polymer may be modified with a monomer having a polar functional group such as a carboxylic acid group, a sulfonic acid group, a phosphoric acid group, a hydroxy group, or the like. The negative active material layer 10*a* may include a post-described fluorine resin-containing particulate as a binder. The fluorine resin-containing particulate may be added to slurry in a powder form and dispersed therein or in an aqueous dispersion form. Accordingly, the slurry for forming the negative active material layer 10*a* may use water as a solvent.

An amount ratio of a thickener and a binder in the negative active material layer may be a suitable ratio applicable to a negative active material layer for a rechargeable lithium ion battery.

The negative current collector 10*b* may include a suitable conductive material. Examples thereof include aluminum, copper, stainless steel, nickel-plated steel, or the like. A negative terminal may be connected to the negative current collector 10*b*.

The belt-shaped negative electrode 10 may be manufactured by the following method, as an example. The negative active material layer slurry (aqueous slurry) may be prepared by dispersing a negative active material layer material into water and then, coating the slurry on a current collector. Thereby, a coating layer may be formed and then dried. A fluorine resin particulate and an elastomer-based polymer particulate in the negative active material layer slurry may be dispersed in the negative active material layer 10*a*. Subsequently, the dried coating layer may be compressed with the negative current collector 10*b*, preparing the belt-shaped negative electrode 10.

The belt-shaped separator 20 may include a belt-shaped porous film 20*c* and adhesive layers 20*a* disposed on both sides of the belt-shaped porous film 20*c*.

The belt-shaped porous film 20*c* may be a suitable separator used for a rechargeable lithium ion battery. For example, a porous film or a non-woven fabric having an excellent high rate discharge performance, or the like, may be used alone or as a combination for the belt-shaped porous film 20*c*. The belt-shaped porous film 20*c* may include a resin, for example, a polyolefin-based resin such as polyethylene or polypropylene, a polyester-based resin such as polyethylene terephthalate, polybutylene terephthalate, polyvinylidene fluoride, a vinylidene fluoride (VDF)-hexafluoro propylene (HFP) copolymer, a vinylidene fluoride-perfluoro vinylether copolymer, a vinylidene fluoride-tetrafluoroethylene copolymer, a vinylidene fluoride-trifluoroethylene copolymer, a vinylidene fluoride-fluoroethylene copolymer, a vinylidene fluoride-hexafluoro acetone copolymer, a vinylidene fluoride-ethylene copolymer, a vinylidene fluoride-propylene copolymer, a vinylidene fluoride-trifluoro propylene copolymer, a vinylidene fluoride-tetrafluoroethylene-hexafluoro propylene copolymer, a vinylidene fluoride-ethylene-tetrafluoroethylene copolymer, or the like.

The adhesive layer 20*a* may include a fluorine resin-containing particulate 20*b*-1, a binder particle 20*b*-2, and a heat-resistant filler particle 20*b*-3. The adhesive layer 20*a* may bind the belt-shaped separator 20 with the belt-shaped negative electrode 10 and the belt-shaped positive electrode 30. In FIG. 1, the adhesive layers 20*a* are shown as being formed on both sides of the belt-shaped separator 20. In some implementations, the adhesive layer 20a may be formed on at least one surface thereof.

The fluorine resin-containing particulate 20b-1 may include a fluorine resin. Examples of the fluorine resin included in the fluorine resin-containing particulate 20b-1 may include PVDF or a PVDF-containing copolymer. The PVDF-containing copolymer may be a copolymer of vinylidene fluoride (VDF) and hexafluoro propylene (HFP), a copolymer of vinylidene fluoride (VDF) and tetrafluoroethylene (TFE), or the like. For the fluorine resin, the copolymer modified with a polar group such as carboxylic acid or the like may be used.

The particle diameter of the fluorine resin-containing particulate 20b-1 (when the fluorine resin-containing particulate 20b-1 is spherical) may be a suitable size to be dispersible in the negative active material layer 10a. For example, the fluorine resin-containing particulate 20b-1 may have an average particle diameter (an arithmetic average of particle diameters) in a range of about 80 nm to about 500 nm. The average particle diameter of the fluorine resin-containing particulate 20b-1 may be, for example, measured by a laser diffractometry method. For example, a laser diffractometry method may be used to measure the particle distribution of the fluorine resin-containing particulate 20b-1, and the obtained particle distribution may be used to calculate the arithmetic average of particle diameters. Average particle diameters of other particles may be measured in the same way.

The fluorine resin-containing particulate 20b-1 may be variously processed, for example, combined with another resin, unless an effect according to one exemplary embodiment is deteriorated. For example, the fluorine resin-containing particulate 20b-1 may be combined with an acrylic resin. The fluorine resin-containing particulate 20b-1 may have an IPN (inter-penetrating network polymer) structure.

The fluorine resin-containing particulate 20b-1 may be prepared by, for example, emulsion-polymerizing a monomer (for example, VDF) including a fluorine resin. In some implementations, the fluorine resin-containing particulate 20b-1 may be prepared by suspension-polymerizing a monomer including a fluorine resin and grinding a coarse particle obtained therefrom.

The fluorine resin-containing particulate 20b-1 may appropriately be a spherical-shaped particle. The spherically-shaped fluorine resin-containing particulate 20b-1 may be prepared, for example, in the emulsion polymerization method. In addition, the fluorine resin-containing particulate 20b-1 may be, for example, examined with SEM (a scanning electron microscope).

A binder particle 20b-2 for the adhesive layer 20a may support the fluorine resin-containing particulate 20b-1 in the adhesive layer 20a. The total volume of the binder particle 20b-2 in the adhesive layer 20a may be smaller than the total volume of the fluorine resin-containing particulate 20b-1 in the adhesive layer 20a. For example, the total volume of the fluorine resin-containing particulate 20b-1 divided by the total volume of the binder particle 20b-2 for the adhesive layer may be in a range of about 2 to about 20.

When the adhesive layer 20a includes the fluorine resin-containing particulate 20b-1 and the binder particle 20b-2 for an adhesive layer in the above volume ratio, the handling property of the belt-shaped separator 20 during the preparation may be improved. For example, the slipperiness of the belt-shaped separator 20 may be improved, and deformation of the wound electrode assembly 100 may be suppressed. As a result, the cycle-life of a battery may be improved.

An average particle diameter of the binder particle 20b-2 may be about 100 to about 500 nm. The binder particle 20b-2 may include, for example, at least one selected from an ionic non-water-soluble binder particle, and a non-ionic non-water-soluble binder particle. The binder particle 20b-2 may further include at least one selected from a non-ionic water-soluble binder and an ionic water-soluble binder in addition to the above-described binder particle. The content of the ionic water-soluble binder may be less than or equal to about 2 mass % (based on the mass of fluorine resin-containing particulate). The ionic water-soluble binder may be included in an amount of less than or equal to about 1.0 mass %.

Without being bound to any particular theory, it is believed that when the ionic water-soluble binder is included in an amount of greater than about 2 mass %, the adherence of the adhesive layer 20a may be deteriorated, for the following reasons. The adherence of the adhesive layer 20a may be realized when polar groups included in the fluorine resin-containing particulate 20b-1, the ionic non-water-soluble binder, or the like, are oriented in a particular direction on the interface with an electrode (for example, a negative electrode). When the content of the ionic water-soluble binder is larger than about 2 mass %, the ionic water-soluble binder that is uniformly distributed in coating and drying processes may have negative influence on the polar groups on the surface of the electrode. As a result, adherence of the adhesive layer 20a may be deteriorated.

The ionic non-water-soluble binder may be, for example, a carboxylic acid-modified acrylic acid ester, a polyolefin ionomer or a carboxylic acid-modified styrene-butadiene copolymer. The ionic non-water-soluble binder may be used singularly or in a mixture thereof.

The non-ionic non-water-soluble binder particle may be, for example, a polybutyl acrylate aqueous dispersion or the like obtained by emulsion-polymerizing a radical polymerizable monomer such as butyl acrylate or the like, an anion-based surfactant such as sodium lauryl sulfate or the like, or a water-soluble initiator such as potassium persulfate. The non-ionic non-water-soluble binder may be obtained by appropriately copolymerizing a monomer including a hydroxy group such as acrylic acid-2-hydroxyethyl to improve dispersion stability in water. The non-ionic non-water-soluble binder may be one or more selected among these materials.

The non-ionic water-soluble binder may be, for example, poly-N-vinyl acetamide (PNVA), polyvinyl alcohol (PVA), polyvinylpyrrolidone (PVP), hydroxyethyl cellulose, methyl cellulose, hydroxypropyl cellulose, hydroxypropyl guar gum, locust bean gum, or polyoxyethylene. The non-ionic water-soluble binder may be used singularly or in a mixture thereof.

The ionic water-soluble binder may be, for example, poly acrylic acid, carboxymethyl cellulose (CMC), a styrene-maleic acid copolymer, an isobutylene-maleic acid copolymer, an N-vinyl acrylamide-acrylic acid copolymer, an alkali metal salt thereof, an ammonium salt thereof, or the like. The ionic water-soluble binder may be one or more selected among these materials.

The adhesive layer 20a may also include a thickener to provide appropriate viscosity during coating and to ensure dispersion stability of heat-resistant filler particles. The thickener may be the non-ionic water-soluble binder. In addition, the adhesive layer 20a may further include a heat-resistant filler particle 20b-3 to adjust porosity and obtain thermal stability.

The heat-resistant filler particles 20b-3 may have an average particle diameter in a range of about 10 to about 100 nm. The average particle diameter of the heat-resistant filler particles 20b-3 may be less than or equal to the average particle diameter of the binder particles 20b-2. Without being bound to any particular theory, it is believed that the energy density of a rechargeable lithium ion battery is improved when the adhesive layer 20a is a thin film. The adhesive layer 20a may formed as a thin film by decreasing the average particle diameter of the particles comprising the adhesive layer 20a. Accordingly, in the present embodiment, the heat-resistant filler particles 20b-3 have a small average particle diameter, for example, in a range of about 10 to about 100 nm.

However, when the binder particles 20b-2 have a small average particle diameter, the binder particles 20b-2 and the heat-resistant filler particles 20b-3 may infiltrate into, and clog the pores of, the belt-shaped porous film 20c such that characteristics of a rechargeable lithium ion battery may deteriorate. Such clogging may be suppressed by using the binder particle 20b-2 having an average particle diameter that is equal to or greater than average particle diameter of the heat-resistant filler particles 20b-3. For example, the binder particles 20b-2 may have an average particle diameter ranging from about 100 to about 500 nm.

In this way, energy density may be improved by making the average particle diameter of the heat-resistant filler particle 20b-3 smaller and the average particle diameter of the binder particles 20b-2 larger to form the adhesive layer 20a into a thin film. In addition, the heat-resistant filler particles 20b-3 is included in the surface layer (i.e., the adhesive layer 20a) of the separator 20. Accordingly, heat resistance of a rechargeable lithium ion battery may be improved.

In addition, when a correlation between the average particle diameter of the heat-resistant filler particle 20b-2 and the average particle diameter of the binder particle 20b-2 satisfies at least one of Equations 1 and 2, or, for example, both of Equations 1 and 2, characteristics of a rechargeable lithium ion battery may be much improved.

$$y<(50/17)*(x+70) \quad \text{(Equation 1)}$$

$$y>(10/7)*(120-x) \quad \text{(Equation 2)}$$

In Equations 1 and 2, y is the average particle diameter of the binder particle and x is the average particle diameter of the heat-resistant filler particle.

The heat-resistant filler particle may be a heat-resistant organic filler particle, a heat-resistant inorganic filler particle (inorganic particle), or a mixture thereof. In a mixture thereof, a suitable mixing ratio of the heat-resistant organic filler particle and the inorganic filler particle may be selected. The heat-resistant inorganic filler particle may be more desirable as having better heat resistance than the heat-resistant organic filler particle The heat-resistant organic filler particle may be, for example, cross-linked polystyrene (cross-linked PS), cross-linked poly methylmethacrylate (cross-linked PMMA), a silicone resin, cured epoxy, polyether sulfone, polyamide-imide, polyimide, a melamine resin, a polyphenylenesulfide resin particulate, or the like. The heat-resistant organic filler particle may be one or more selected from these materials. The heat-resistant inorganic filler particle may be, for example, a ceramic particle or, for example, a metal oxide particle. The metal oxide particle may be, for example, particulates of alumina, boehmite, titania, zirconia, magnesia, zinc oxide, aluminum hydroxide, magnesium hydroxide, or the like. An amount of the heat-resistant filler particle may be, for example less than or equal to about 70 mass % based on the total mass of the adhesive layer 20a.

The adhesive layer 20a may be manufactured in the following method. A material for the adhesive layer 20a may be dissolved in and/or dispersed in water to prepare adhesive layer mix slurry (aqueous slurry). Subsequently, this adhesive layer mix slurry may be coated onto at least one surface of the belt-shaped porous film 20c to form a coating layer. Then, this coating layer may be dried. Through this process, the adhesive layer 20a may be formed.

The belt-shaped positive electrode 30 may include a positive current collector 30b and a positive active material layer 30a formed on both surfaces of the positive current collector 30b. The positive active material layer 30a may include at least a positive active material and further a conductive agent and a binder. The positive active material may include at suitable material that reversibly intercalates and deintercalates lithium ions. For example, the positive active material may include lithium cobalt oxide (LCO), lithium nickel oxide, lithium nickel cobalt oxide, lithium nickel cobalt aluminum oxide (hereinafter, referred as "NCA"), lithium nickel cobalt manganese oxide (hereinafter, referred to as "NCM"), lithium manganate, lithium iron phosphate, nickel sulfate, copper sulfate, sulfur, iron oxide, vanadium oxide, or the like. These positive active materials may be used alone or as a mixture of more than two.

As an example of the positive active materials, a lithium salt of transition metal oxide having a layered rock salt structure may be used. The lithium salt of transition metal oxide having a layered rock salt structure may be, for example, a lithium salt of ternary transition metal oxide represented by $Li_{1-x-y-z}Ni_xCo_yAl_zO_2$(NCA) or $Li_{1-x-y-z}Ni_xCo_yMn_zO_2$(NCM) ($0<x<1$, $0<y<1$, $0<z<1$, simultaneously $x+y+z<1$).

The conductive agent may be, for example, carbon black such as ketjen black, acetylene black, or the like, natural graphite, artificial graphite, or the like, to improve conductivity of the positive electrode.

The binder may bond the positive active material itself and also may bond the positive active material with the positive current collector 30b. The binder may be a suitable binder that binds the positive active material and the conductive agent on the current collector in a rechargeable lithium ion battery. For example, the binder may be polyvinylidene fluoride, a vinylidene fluoride (VDF)-hexafluoro propylene (HFP) copolymer, a vinylidene fluoride-perfluoro vinylether copolymer, a vinylidene fluoride-tetrafluoroethylene copolymer, a vinylidene fluoride-trifluoroethylene copolymer, an ethylenepropylene diene terpolymer, a styrene butadiene rubber, an acrylonitrile butadiene rubber, a fluororubber, polyvinyl acetate, polymethyl methacrylate, polyethylene, or cellulose nitrate.

The positive current collector 30b may include a suitable conductor. For example, the positive current collector 30b may include aluminum, stainless steel, nickel-plated steel, or the like. The positive current collector 30b may be connected with a positive terminal.

The belt-shaped positive electrode 30 may be manufactured, for example, in the following method. A material of the positive active material layer may be dispersed in an organic solvent or water to prepare positive active material layer slurry, and then, the positive active material layer slurry is coated onto a current collector. Thereby, a coating layer may be formed. Then, this coating layer may be dried. Then, the dried coating layer may be compressed with the positive current collector 30b. Thereby, a belt-shaped positive electrode 30 may be manufactured.

The electrode stack structure 100a may be manufactured by sequentially stacking the belt-shaped negative electrode 10, the belt-shaped separator 20, the belt-shaped positive electrode 30, and the belt-shaped separator 20. Accordingly, the belt-shaped separator 20 may be disposed on one surface of the electrode stack structure 100a, and the belt-shaped negative electrode 10 may be disposed on the other surface thereof. Accordingly, the one surface of the electrode stack structure 100a (i.e., the belt-shaped separator 20) may contact the rear surface of the electrode stack structure 100a (i.e., the belt-shaped negative electrode 10) when the electrode stack structure 100a is wound.

The non-aqueous electrolyte solution may be obtained by dissolving an electrolytic salt in an organic solvent. The electrolytic salt may be, for example, a lithium salt. The electrolytic salt may be, for example, an inorganic ion salt including lithium (Li), sodium (Na) or potassium (K) such as $LiClO_4$, $LiBF_4$, $LiAsF_6$, $LiPF_6$, $LiPF_{6-x}(C_nF_{2n+1})_x$ (1<x<6, n=1 or 2), LiSCN, LiBr, LiI, $Li_2SO_4$, $Li_2B_{10}Cl_{10}$, $NaClO_4$, NaI, NaSCN, NaBr, $KClO_4$, KSCN or the like, an organic ion salt such as $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $(CH_3)_4NBF_4$, $(CH_3)_4NBr$, $(C_2H_5)_4NClO_4$, $(C_2H_5)_4NI$, $(C_3H_7)_4NBr$, $(n-C_4H_9)_4NClO_4$, $(n-C_4H_9)_4NI$, $(C_2H_5)_4N$-maleate, $(C_2H_5)_4N$-benzoate, $(C_2H_5)_4N$-phthalate, lithium stearyl sulfate, lithium octyl sulfate, lithium dodecylbenzene sulfonate. These may be used singularly or in a mixture of two or more. The concentration of the electrolytic salt may be the same as that of a non-aqueous electrolyte used in a general rechargeable lithium battery. For example, an electrolyte solution including an appropriate lithium compound (electrolytic salt) at a concentration of about 0.8 to about 1.5 mol/L may be used.

The organic solvent may be, for example, a cyclic carbonate ester such as propylene carbonate, ethylene carbonate, butylene carbonate, chloroethylene carbonate, vinylene carbonate, or the like; a cyclic ester such as γ-butyrolactone, γ-valero lactone or the like; a linear carbonate such as dimethyl carbonate, diethylcarbonate, ethylmethyl carbonate, or the like; a linear ester such as methyl formate, methyl acetate, methyl butyrate, or the like; an ether such as tetrahydrofuran or a derivative thereof; an ether such as 1,3-dioxane, 1,4-dioxane, 1,2-dimethoxy ethane, 1,4-dibutoxyethane, methyl diglyme or the like; a nitrile such as acetonitrile, benzonitrile, or the like; dioxolane or a derivative thereof; ethylene sulfide, sulfolane, sultone or a derivative thereof which may be used singularly or as a mixture of two or more. A non-aqueous electrolyte solution may be impregnated into the belt-shaped separator 20. In some implementations, each electrode may appropriately include a known auxiliary conductive agent, an additive, or the like. The exterior material may be, for example, aluminum laminate.

Method of Manufacturing Non-Aqueous Electrolyte Rechargeable Lithium Ion Battery Subsequently, a method of manufacturing a non-aqueous electrolyte rechargeable lithium ion battery is illustrated.

Method of Manufacturing a Belt-Shaped Positive Electrode

The belt-shaped positive electrode 30 may be, for example, manufactured in the following method. A material of a positive active material layer may be dispersed in an organic solvent or water to prepare positive active material layer slurry. The positive active material layer slurry may be coated onto a current collector to form a coating layer. Subsequently, the coating layer may be dried. Then, the dried coating layer may be compressed with a positive current collector 30b. Thereby, a belt-shaped positive electrode 30 may be manufactured.

Method of Manufacturing a Belt-Shaped Negative Electrode

The belt-shaped negative electrode 10 may be, for example, manufactured in the following method. A material of a negative active material layer may be dispersed in water to prepare negative active material layer slurry. The negative active material layer slurry may be coated onto a current collector to form a coating layer. Subsequently, the coating layer may be dried. The fluorine resin particulate and the elastomer-based polymer particulate in the negative active material layer slurry may be dispersed in a negative active material layer 10a. Subsequently, the dried coating layer may be compressed with a negative current collector 10b. Thereby, a belt-shaped negative electrode 10 may be manufactured.

Method of Manufacturing a Belt-Shaped Separator

The belt-shaped separator 20 may be manufactured in the following method. A material for an adhesive layer 20a may be dispersed in and dissolved in water, preparing adhesive layer mix slurry. Subsequently, this adhesive layer mix slurry may be coated onto at least one surface of a belt-shaped porous film 20c to form a coating layer. Then, this coating layer may be dried to form an adhesive layer 20a, thereby manufacturing, a belt-shaped separator 20.

Method of Manufacturing Wound Electrode Assembly and Battery

The belt-shaped negative electrode 10, the belt-shaped separator 20, the belt-shaped positive electrode 30, and the belt-shaped separator 20 may be sequentially stacked, manufacturing the electrode stack structure 100a. Subsequently, the electrode stack structure 100a may be wound. Accordingly, one surface of the electrode stack structure 100a (i.e., the belt-shaped separator 20) may contact the other surface of the electrode stack structure 100a (i.e., the belt-shaped negative electrode 10). Through this process, the wound electrode assembly 100 may be manufactured. Subsequently, the wound electrode assembly 100 may be pushed down and flattened. The flat wound electrode assembly 100 may be inserted into an exterior material (for example, a laminate film) with a non-aqueous electrolyte, and the exterior material may be sealed, preparing a rechargeable lithium ion battery. When the exterior material is sealed, a terminal end connected to each current collector may protrude out of the exterior material.

EXAMPLES

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Example 1

Manufacture of Positive Electrode

Lithium cobalt oxide, carbon black, and polyvinylidene fluoride (PVDF) in a solid mass ratio of 96:2:2 were dissolved and dispersed in N-methyl pyrrolidone, preparing a positive active material layer slurry. The positive active material layer slurry was coated onto both sides of a 12 μm-thick aluminum foil as a current collector, and dried. The dried coating layer was compressed to manufacture a positive active material layer. The current collector and the positive active material layer had a total thickness of 120 μm. Subsequently, an aluminum lead wire was welded at the terminal end of the electrode, obtaining a belt-shaped positive electrode.

Manufacture of Negative Electrode

A negative active material layer slurry was prepared by dissolving and dispersing graphite, a modified SBR particulate aqueous dispersion, a fluorine resin-containing particulate aqueous dispersion prepared by polymerizing an acrylic resin in polyvinylidene fluoride aqueous dispersion, and a sodium salt of carboxymethyl cellulose in a solid mass ratio of 97:1:1:1 in and into water as a solvent. Subsequently, this negative active material layer slurry was coated onto both sides of a 10 μm-thick copper foil as a current collector and dried. The dried coating layer was compressed to obtain a negative active material layer. A total thickness of the current collector and the negative active material layer was 120 μm. Then, a nickel lead wire was welded at the terminal end, preparing a belt-shaped negative electrode. The fluorine resin-containing particulate had an average particle diameter of about 300 nm when measured by a laser diffraction method. Average particle diameters of other particles were measured by the same method. In addition, when the fluorine resin-containing particulate was examined with SEM, to the fluorine resin-containing particulate was found to be a spherically-shaped particle.

Manufacture of Separator

The fluorine resin-containing particulate aqueous dispersion, a polyethylene ionomer aqueous dispersion (a binder particle) having an average particle diameter of 480 nm, sodium polyacrylate, and a boehmite particle (a heat-resistant filler particle) having an average particle diameter of 90 nm were dissolved and dispersed in water as a solvent, preparing an adhesive layer mix slurry. Herein, the fluorine resin-containing particulate, the binder particle, the sodium polyacrylate, and the heat-resistant filler particle were mixed in a volume ratio of 40:10:0.3:50.

Subsequently, the adhesive layer mix slurry was coated onto both sides of a 12 μm-thick corona-treated porous polyethylene separator film and dried, to manufacture coating layers. The coating layers were dried, obtaining a separator having a 3 μm-thick adhesive layer 20a at both sides.

Manufacture of Wound Electrode Assembly

The negative electrode, the separator, the positive electrode, and the separator were stacked in order and wound in a length direction by using a wick having a diameter of 3 cm. After fixing the end of the wound electrode assembly with a tape, the wick was removed, and the cylindrical wound electrode assembly was put between two sheets of a 3 cm-thick metal plate and maintained for 3 seconds, preparing a flat wound electrode assembly. The positive electrode, the negative electrode, and the separator had lengths in the following order of the separator (32 mm)>the negative electrode (30 mm)>the positive electrode (28 mm) in a direction (referred to as a "TD direction") perpendicular to a winding direction (referred to as a "MD direction"). The positive electrode, the negative electrode, and the separator were disposed by setting at their centers. A distance from the end of the TD direction of the separator to the end of the TD direction of the positive electrode, for example, a margin, was 2 mm both at the top and at the bottom.

Evaluation of Thickness Increase Ratio

The obtained wound electrode assembly was allowed to stand for 48 hours. A thickness increase ratio of the wound electrode assembly before and after 48 hours was measured to evaluate shape stability. Herein, a smaller thickness increase ratio indicates satisfactory shape stability (i.e., a wound electrode assembly is only a little bit distorted). The thickness increase ratio was obtained by dividing the increased thickness of the wound electrode assembly before and after allowed to stand for 48 hours by the thickness of the device before allowed to stand.

Manufacture of Battery Cell

A battery cell was prepared by sealing the wound electrode assembly and an electrolyte solution within a laminate film including three polypropylene/aluminum/nylon layers under a reduced pressure, with two lead wires extending outwardly from the prepared battery cell. The electrolyte solution was prepared by providing ethylene carbonate/ethyl methyl carbonate in a volume ratio of 3:7 and dissolving 1 M $LiPF_6$ in the mixed solvent. The battery cell was inserted between two sheets of 3 cm-thick metal plate and heated at 90° C. for 5 minutes. The obtained battery cell was constant current charged up to 4.4 V with 1/10 CA of design capacity (1 CA is a discharge rate per one hour) and constant voltage charged at 4.4 V up to 1/20 CA. Then, the cell was constant current discharged with 1/2 CA to 3.0 V. The capacity at this time was regarded as the initial discharge capacity.

Load Characteristics

Then, the cell was charged under the above condition and low current-discharged at 3/2 CA to 3.0 V, and the discharge capacity of the cell at this time was measured. This discharge capacity was divided by the initial discharge capacity of the cell, obtaining a discharge capacity retention (load characteristics). A high discharge capacity retention indicate that energy is efficiently used.

Cycle-life Test

A cycle test was performed by repetitively constant current charging the cell at 0.5 CA and 4.4 V and constant voltage charging the cell up to 0.05 CA as a charge process and discharging the cell at 0.5 CA and 3.0 V. Its discharge capacity decrease rate (a persistency rate) based on the initial discharge capacity after 100 cycles was measured to evaluate cycle-life performance. A small discharge capacity decrease rate indicates improved cycle-life characteristics. The retention rate was obtained by dividing the initial discharge capacity by the discharge capacity after 100 cycles Desirable Thickness for Coating Layer To prepare various kinds of separators having adhesive layers of different thicknesses, coating layers having thicknesses of 1, 1.5, 2, and 2.5 μm (a thickness on one side of the separator) were formed on separator films by the same method described above and dried, forming adhesive layers on both sides of a film. These separators were respectively used to manufacture rechargeable battery cells through the aforementioned method. These rechargeable battery cells were allowed to stand in a 150° C. thermostat for 1 hour. The rechargeable battery cells were taken out of the thermostat and cooled down and then, decomposed. The contraction in the TD direction of the separators in the middle of the rechargeable battery cells was examined. It was determined that when the thickness of the adhesive layers was smaller, the contraction of the separator was larger. A minimum desirable thickness for separating the positive and negative electrodes from the separator was determined as a desirable thickness for the coating layer (a desirable thickness for the adhesive layer). When the desirable thickness is smaller, a rechargeable battery may be manufactured to be thinner and also have higher energy density.

Examples 2 to 8

The same treatment as in Example 1 was performed in Examples 2 to 8 except for changing the composition of the binder particle and the heat-resistant filler particle as shown in Table 1.

Comparative Example 1

A separator was manufactured by coating a solution obtained by dissolving PVDF in N-methyl pyrrolidone on both sides of a 12 μm-thick porous polyethylene film, dipping the coated film in water, and drying the dipped, coated film to form meshed porous adhesive layers. The adhesive layers respectively had a thickness of 3 μm. The other treatments than the above treatment were the same as in Example 1.

Comparative Examples 2, 3, and 4

Each separator according to Comparative Examples 2 and 3 was manufactured by performing the same treatment as in Example 1 except for changing the composition of the binder particle and the heat-resistant filler particle as shown in Table 1.

TABLE 1

| | Heat-resistant filler particle | | Binder particle | |
|---|---|---|---|---|
| | Presence of fluorine resin containing particulate in separator | composition | average particle diameter (nm) | composition | average particle diameter (nm) |
| Example 1 | Yes | boehmite | 95 | polyethylene ionomer | 480 |
| Example 2 | Yes | TiO$_2$ | 15 | Modified SBR | 210 |
| Example 3 | Yes | TiO$_2$ | 15 | Modified SBR | 180 |
| Example 4 | Yes | alumina | 60 | Modified SBR | 180 |
| Example 5 | Yes | alumina | 60 | polyethylene ionomer | 120 |
| Example 6 | Yes | boehmite | 95 | polyethylene ionomer | 120 |
| Example 7 | Yes | TiO$_2$ | 15 | Modified SBR | 480 |
| Example 8 | Yes | TiO$_2$ | 15 | polyethylene ionomer | 120 |
| Comparative Example 1 | No | — | — | — | — |
| Comparative Example 2 | Yes | TiO$_2$ | 15 | polyacrylate ester | 70 |
| Comparative Example 3 | Yes | boehmite | 95 | polyacrylate ester | 610 |
| Comparative Example 4 | Yes | alumina | 150 | Modified SBR | 180 |

Figure 3:
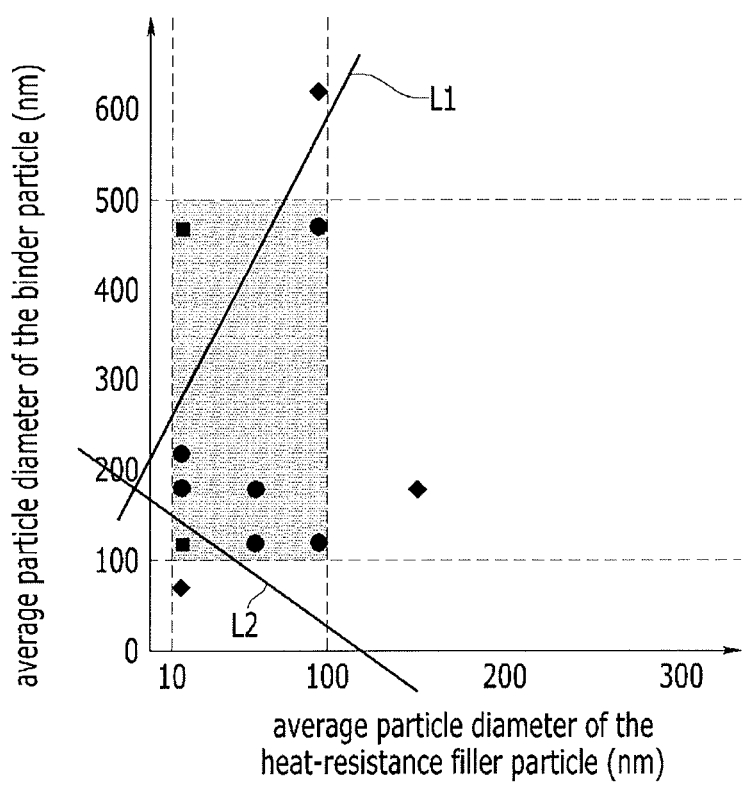
FIG. 3 illustrates a graph showing a correlation among the average particle diameter of a binder particle and the average particle diameter of the heat-resistant filler particle, and characteristics (a comprehensive evaluation) of a rechargeable battery.

In addition, the evaluation results are provided in Table 2 and FIG. 3. In FIG. 3, a horizontal axis x indicates the average particle diameter of the heat-resistant filler particle, while a vertical axis y indicates the average particle diameter of the binder particle. In FIG. 3 "●" satisfies all the above conditions of both Equations 1 and 2 and a condition that "a binder particle has an average particle diameter ranging from 100 to 500 nm, and a heat-resistant filler particle has an average particle diameter ranging from 10 to 100 nm". "■" satisfies a condition that "a binder particle has an average particle diameter ranging from 100 to 500 nm, and a heat-resistant filler particle has an average particle diameter ranging from 10 to 100 nm" but does not satisfy both Equations 1 and 2. "♦" does not satisfy a condition that a binder particle has an average particle diameter ranging from 100 to 500 nm, and a heat-resistant filler particle has an average particle diameter ranging from 10 to 100 nm" (i.e., beyond the range of the present embodiment). The graph line L1 refers to Equation $y=(50/17)*(x+70)$, and a graph line L2 refers to $y=(10/7)*(120-x)$.

TABLE 2

| | Thickness increase ratio (%) | Cycle-life (%) | Minimum effective thickness of adhesive layer (um) | Load characteristics (%) |
|---|---|---|---|---|
| Example 1 | 6 | 93 | 2 | 85 |
| Example 2 | 6 | 93 | 1 | 84 |
| Example 3 | 5 | 93 | 1 | 82 |
| Example 4 | 5 | 92 | 1 | 83 |
| Example 5 | 6 | 91 | 1 | 81 |
| Example 6 | 7 | 91 | 2 | 82 |
| Example 7 | 5 | 92 | 2 | 84 |
| Example 8 | 6 | 90 | 1 | 81 |
| Comparative Example 1 | 10 | 85 | >3 | 83 |
| Comparative Example 2 | 6 | 88 | 2 | 77 |
| Comparative Example 3 | 5 | 89 | 3 | 84 |
| Comparative Example 4 | 5 | 89 | 3 | 84 |

Battery cells with the wound electrode assemblies as described in Examples 1 to 8 all exhibited a small thickness increase ratio and a satisfactory cycle-life. In addition, the battery cells of Examples 1 to 8 exhibited a small minimum effective thickness for adhesive layers and satisfactory load characteristics. Accordingly, since the adhesive layers were thin films in Examples 1 to 8, satisfactory energy density was obtained. On the other hand, the wound electrode assembly of Comparative Example 1 used a fluorine resin-containing polymer having not a particle phase but a meshed structure and thus showed deteriorated shape stability after manufacturing a wound electrode assembly into a flat shape. For example, the wound electrode assembly of Comparative Example 1 was more deformed than the wound electrode assemblies of Examples. In addition, the flat-shaped wound electrode assembly according to Comparative Example 1 was deformed, and the battery cell according to Comparative Example 1 exhibited a deteriorated cycle-life. The belt-shaped separator of Comparative Example 1 had insufficient slipperiness as compared to the belt-shaped separators of Examples 1 to 8. Accordingly, when the wound electrode assembly was manufactured to have a flat shape, the stacked electrodes and separator did not slip well where they contacted each other. As a result, the wound electrode assembly was deformed. When the deformed wound electrode assembly of Comparative Example 1 was used to manufacture a battery cell, a distance between the electrodes in the battery cell was not stable, and the cycle-life was deteriorated.

In addition, at least either a minimum effective thickness for an adhesive layer or load characteristics were insufficient in Comparative Examples 2 to 4 compared with Examples 1 to 8. Accordingly, comparing Examples 1 to 8 and Comparative Examples 2 to 3, the superior results may be obtained when the binder particles have an average particle diameter ranging from about 100 nm to about 500 nm, and the heat-resistant filler particles have an average particle diameter ranging from about 10 nm to about 100 nm.

In addition, comparing Examples 1 to 6 with Examples 7 to 8, Examples 1 to 6 showed satisfactory characteristics. Examples 1 to 6 all satisfied Equations 1 and 2. Accordingly, at least either one of Equations 1 and 2 should be satisfied, and better results may be obtained when Equations 1 and 2 are both satisfied.

Accordingly, a wound electrode assembly according to the embodiments may be manufactured by using a separator capable of being easily handled during a manufacturing process. In addition, the wound electrode assembly may be suppressed from deformation and simultaneously, the cycle-life of a non-aqueous electrolyte rechargeable battery may be improved. In addition, when the binder particle and the heat-resistant filler particle all have average particle diameters respectively satisfying the above requirements, an adhesive layer may be formed as a thin film, and energy density may be improved. In addition, heat resistance of the wound electrode assembly, for example, heat resistance of a non-aqueous electrolyte rechargeable battery cell using the wound electrode assembly, may be improved.

By way of summation and review, a porous film may be formed on the surface of the separator by a method that includes preparing a slurry by dissolving a fluorine resin in an organic solvent such as NMP (N-methyl pyrrolidone), dimethyl acetamide, acetone, or the like, coating the slurry onto a separator or an electrode, and phase-separating the fluorine resin by using a poor solvent such as water, methanol, tripropylene glycol, or the like or vapor thereof to form a porous coating layer. Another method includes preparing a thermal slurry by dissolving a fluorine resin in a heating electrolytic solution such as dimethyl carbonate, propylene carbonate, ethylene carbonate, or the like to prepare heated slurry, coating the heated slurry onto a separator or an electrode, cooling down the coating layer, and transforming the fluorine resin into gel (a porous film swollen by an electrolyte solution).

However, a separator having a PVDF porous film on the surface in the above method may have insufficient slipperiness compared to a separator having no porous film and the PVDF porous film may easily become electrostatic. Thus may be difficult to handle the separator in a preparing process. For example, when the separator is overlapped with belt-shaped positive and negative electrodes to form a wound electrode assembly, the wound electrode assembly may become deformed due to the insufficient mutual slipperiness of the separator. When the wound electrode assembly is deformed, the wound electrode assembly may be difficult to insert into a case. In addition, a non-aqueous electrolyte rechargeable battery using this deformed wound electrode assembly may have an insufficient cycle-life.

A method of adding a heat-resistant filler to the porous film to suppress thermal shrinkage of a separator during the heating may have disadvantages it may be difficult to fill the porous film (gel electrolyte film) with heat-resistant filler particles with a high density. Accordingly, when an attempt to provide heat resistance to the porous film is made, an thickness of the porous film may be an issue. The thick porous film may cause reduction of energy density of the rechargeable battery.

In contrast, embodiments provide a wound electrode assembly for a non-aqueous electrolyte rechargeable battery in which deformation is suppressed and improving heat resistance and energy density are simultaneously improved by improving a handling property of the separator during the manufacturing process. Embodiments also provide a non-aqueous electrolyte rechargeable battery using the same, and a method of manufacturing a wound electrode assembly for a non-aqueous electrolyte rechargeable battery.

According to embodiments, the handling properties of the may be improved and deformation of the wound electrode assembly may be suppressed. In addition, an adhesive layer on a surface of a belt-shaped porous film may be in a form of a thin film and thus, energy density may be improved. In addition, the heat resistance of the wound electrode assembly, for example, heat resistance of a non-aqueous electrolyte rechargeable battery using the wound electrode assembly may be improved Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A wound electrode assembly for a non-aqueous electrolyte rechargeable battery, the wound electrode assembly comprising:
a positive electrode,
a negative electrode,
a porous film between the positive electrode and negative electrode, the positive electrode, the negative electrode, and the porous film each being belt-shaped, and
an adhesive layer on a surface of the porous film, wherein:
the adhesive layer includes a fluorine resin-containing particulate, a binder particle supporting the fluorine resin-containing particulate, and a heat resistant filler particle,
a total volume of the binder particle in the adhesive layer is smaller than a total volume of the fluorine resin-containing particulate in the adhesive layer,
an average particle diameter of the binder particle is about 100 nm to about 500 nm,
an average particle diameter of the heat-resistant filler particle is 10 nm to 95 nm,
the fluorine resin-containing particulate includes polyvinylidene fluoride,
the heat resistant filler particle includes a metal oxide particle, and
the average particle diameter of the binder particle and the average particle diameter of the heat-resistant filler particle satisfy at least one of Equations 1 and 2, in which y is the average particle diameter of the binder particle and x is the average particle diameter of the heat-resistant filler particle, $$y < (50/17)*(x+70) \qquad (1)$$

$$y > (10/7)*(120-x) \qquad (2).$$

2. The wound electrode assembly as claimed in claim 1, wherein the average particle diameter of the binder particle and the average particle diameter of the heat-resistant filler particle satisfy both the Equations 1 and 2.

3. The wound electrode assembly as claimed in claim 1, wherein the negative electrode includes a negative active material layer including a negative active material and the fluorine resin-containing particulate, and the adhesive layer is bound to the negative active material layer.

4. The wound electrode assembly as claimed in claim 1, wherein the fluorine resin-containing particulate is a spherical particle.

5. The wound electrode assembly as claimed in claim 1, wherein a ratio of the total volume of the fluorine resin-containing particulate in the adhesive layer to the total volume of the binder particle in the adhesive layer is in a range of about 2 to about 20.

6. A non-aqueous electrolyte rechargeable battery comprising the wound electrode assembly as claimed in claim 1.

7. The wound electrode assembly as claimed in claim 1, wherein an average particle diameter of the fluorine resin-containing particulate is about 80 nm to about 500 nm.

8. The wound electrode assembly as claimed in claim 1, wherein the heat-resistant filler particle includes a particle of alumina, boehmite, or titania.

9. The wound electrode assembly as claimed in claim 1, wherein the heat-resistant filler particle includes a particle of boehmite.

10. The wound electrode assembly as claimed in claim 1, wherein an average particle diameter of the heat-resistant filler particle is 10 nm to 60 nm.

11. A method of manufacturing a wound electrode assembly for a non-aqueous electrolyte rechargeable battery, the method comprising coating an aqueous slurry including a fluorine resin-containing particulate, a binder particle supporting the fluorine resin-containing particulate and having a smaller total volume in the adhesive layer than that of the fluorine resin-containing particulate, and a heat-resistant filler particle, onto a surface of a belt-shaped porous film, followed by drying the resultant, wherein:

an average particle diameter of the binder particle is about 100 nm to about 500 nm, an average particle diameter of the heat-resistant filler particle is 10 nm to 95 nm, the fluorine resin-containing particulate includes polyvinylidene fluoride, the heat resistant filler particle includes a metal oxide particle, and the average particle diameter of the binder particle and the average particle diameter of the heat-resistant filler particle satisfy at least one of Equations 1 and 2, in which y is the average particle diameter of the binder particle and x is the average particle diameter of the heat-resistant filler particle, $$y < (50/17)*(x+70) \tag{1}$$

$$y > (10/7)*(120-x) \tag{2}$$

* * * * *